(No Model.)

J. W. WALTER.
NECK YOKE.

No. 554,751. Patented Feb. 18, 1896.

Witnesses: Inventor: John W. Walter,
Reuben G. Orwig. By Thomas G. and J. Ralph Orwig, Attys.
R. H. Orwig.

UNITED STATES PATENT OFFICE.

JOHN W. WALTER, OF VALERIA, IOWA.

NECK-YOKE.

SPECIFICATION forming part of Letters Patent No. 554,751, dated February 18, 1896.

Application filed February 14, 1895. Serial No. 538,466. (No model.)

*To all whom it may concern:*

Be it known that I, JOHN W. WALTER, a citizen of the United States of America, residing at Valeria, in the county of Jasper and State of Iowa, have invented a new and useful Neck-Yoke, of which the following is a specification.

My object is to provide a strong-jointed device for connecting pole-straps with the ends of a pole-yoke and specially adapted for preventing the annoyances and accidents incident to the ends of pole-yokes catching fast to fixed posts and other objects when horses are hitched to a wagon and tied to a post or other fixed object.

My invention consists in the construction of the device and the combination thereof with a neck-yoke, as hereinafter set forth, pointed out in my claim and illustrated in the accompanying drawings, in which—

Figure 1:
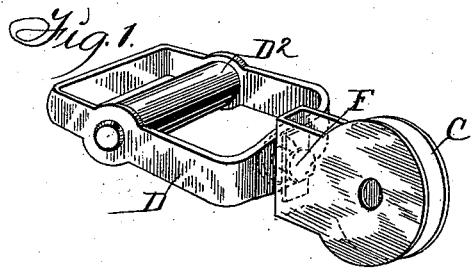
Figure 2:
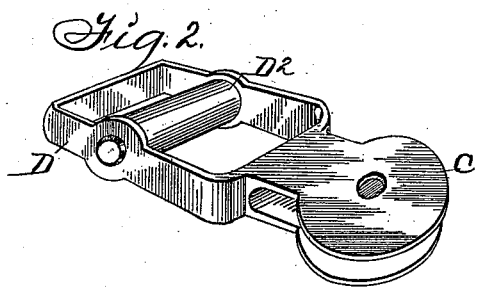
Figure 3:
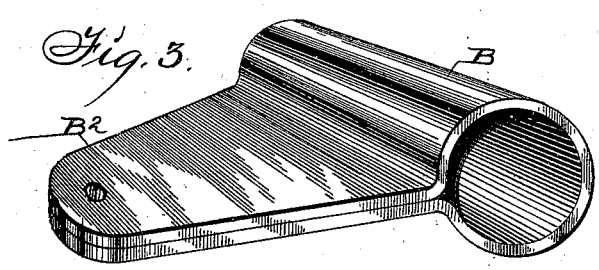
Figure 4:
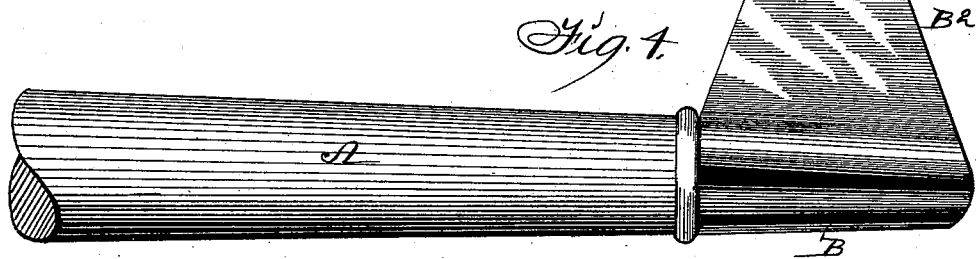

Figure 1 is a perspective view showing the device for connecting the pole-strap with the socket. Fig. 2 is a like view showing a modified form in which the swivel-joint is omitted. Fig. 3 is a perspective view of the socket. Fig. 4 is a top view of the complete device applied to a neck-yoke.

Referring to the accompanying drawings, the reference-letter A is used to indicate the neck-yoke, which is of the ordinary form and has straight slightly-tapered ends. B indicates a metal socket adapted to be placed on one of said ends to fit securely thereto.

$B^2$ is an integral tapering projection at the surface of the socket B and extending the entire length of the socket at its broad end, and specially adapted for pivotally connecting a rigid frame to its small end in such a manner that the rigid extension $B^2$ and the rigid frame pivoted thereto will serve as a guard for preventing the end of the pole-yoke from getting engaged with a post or other fixed object when the pole-yoke is connected with horses by means of straps.

C indicates a metal frame adapted to overlap the sides of the rear extremity of the tapering extension $B^2$ and provided with a central bore adapted to admit a rivet or bolt $C^2$, whereby the said frame may be pivotally connected with the tapering extension. A jointed metal strap-holding device is thus produced that allows longitudinal motion to the pole-yoke and prevents the ends of the pole-yoke from engaging a post or other fixed object, while at the same time a pole-strap connecting the device with a collar on a horse allows a back-and-forth motion of the pole-yoke relative to the horse and the pole with which the pole-yoke is connected.

D indicates a substantially oblong frame, having a roller $D^2$ extended transversely thereof and near one end thereof, whereby the end of the frame and the roller both lie within the loop of the pole-strap and keep the frame in line therewith.

F is a bolt adapted to connect the frame D with the frame C in such a manner as to produce a swivel-joint between the two.

H represents the pole-strap passed around the roller $D^2$ and adapted to be attached to a horse's collar.

In Fig. 2 the swivel-joint between the frame C and D is dispensed with and the device made complete in one piece to produce a cheaper device.

Having thus described my invention, what I claim as new therein, and desire to secure by Letters Patent of the United States therefor, is—

The combination with a neck-yoke, of a socket secured to each end thereof, each socket being provided with a rearwardly-projecting plate or extension, the outer edge of which is flush with the end of the yoke at the front and tapers inwardly to the rear, a metal frame overlapping the rear end of the plate and pivotally secured thereto to move in a plane parallel with the neck-yoke, and provided with a central hole, an oblong frame swiveled to the rear portion of the metal frame by means of a bolt through the hole in the metal frame, and a roller journaled in the oblong frame, near one end thereof, and parallel with the neck-yoke, substantially as set forth.

JOHN W. WALTER.

Witnesses:
THOS. PHILSON,
J. M. INGLE.